United States Patent [19]
Hoshino

[11] 3,863,266

[45] Jan. 28, 1975

[54] PLIANT DISK MAGNETIC RECORDING AND/OR REPRODUCING APPARATUS

[75] Inventor: Mitsuo Hoshino, Tokyo, Japan

[73] Assignee: Sony Corporation, Shinagawa-ku, Tokyo, Japan

[22] Filed: Aug. 23, 1973

[21] Appl. No.: 390,749

[30] Foreign Application Priority Data

Aug. 28, 1972 Japan .............................. 47-100014

[52] U.S. Cl. ...................... 360/86, 346/137, 360/99, 360/107

[51] Int. Cl. ...... G11b 5/52, G11b 5/82, G11b 25/04

[58] Field of Search ............ 179/100.2 P, 100.2 CA; 340/174.1 E; 346/137; 360/86, 137, 99, 107

[56] References Cited

UNITED STATES PATENTS

| | | | |
|---|---|---|---|
| 3,225,338 | 12/1965 | Kelner et al. | 179/100.2 P |
| 3,369,227 | 2/1968 | Boissevain | 179/100.2 P |
| 3,737,880 | 6/1973 | Kelley | 340/174.1 E |

*Primary Examiner*—Alfred H. Eddleman
*Attorney, Agent, or Firm*—Lewis H. Eslinger; Alvin Sinderbrand

[57] ABSTRACT

In an apparatus for magnetically recording and repeatedly reproducing electrical signals, for example, for use in the slow-motion or still playback of video signals, in which a pliant record disk is mounted, at its center, on a rotatable shaft and has a magnetizable surface engaged by an electromagnetic transducer or head for recording or reproducing signals in at least one annular area or record track on the magnetizable surface when the disk is rotated with the shaft between spaced support plates, and in which air entering centrally located apertures of the support plates forms air films flowing radially outward between the record disk and the support plates for maintaining the spacing therebetween during rotation of the disk; at least the support plate confronting the disk surface opposite to the magnetizable surface is perforate and preferably formed with a conically dished configuration so that the spacing between the support plates is progressively reduced in the radially outward direction.

7 Claims, 4 Drawing Figures

PLIANT DISK MAGNETIC RECORDING AND/OR REPRODUCING APPARATUS

BACKGROUND OF THE INVENTION

1. Field of the Invention

This invention relates generally to magnetic recording and/or reproducing apparatus, and more particularly is directed to improvements in apparatus of the type in which signals, such as, video signals, are magnetically recorded in an annular or spiral record track on a pliant record disk and thereafter repeatedly reproduced, for example, as in the slow motion or still playback of video signals.

2. Description of the Prior Art

In previously proposed apparatus of the above described type, the pliant record disk is mounted, at its center, on a motor-driven shaft and is disposed between parallel, spaced apart support plates, and the signals are magnetically recorded or reproduced in an annular area or record track on a magnetizable surface of the record disk by means of an electromagnetic transducer or head chip which extends through the support plate confronting such magnetizable surface. When the record disk is rotated with the shaft, air enters at apertures in the central portions of the support plates and forms air films flowing radially outward between the record disk and support plates for maintaining spacing therebetween. However, with the foregoing arrangement, the pressure in the air film at the side of the record disk facing away from its magnetizable surface is not uniform in the radial direction. More particularly, the pressure in the air film between the magnetizable surface and the support plate confronting the latter becomes greater than, or positive in relation to the pressure in the other air film at the portions of such air films disposed outwardly in respect to the annular area on the record disk contacted by the transducer. As a result of the foregoing, the contact pressure of the transducer with the magnetizable surface of the record disk does not remain constant or uniform and the recording and reproducing characteristics of the apparatus are deteriorated by the varying contact pressure.

SUMMARY OF THE INVENTION

Accordingly, it is an object of this invention to provide a magnetic recording and/or reproducing apparatus of the type in which signals are magnetically recorded and/or reproduced in an annular record track on the magnetizable surface of a pliant record disk by means of an associated electromagnetic transducer or head, and in which the previously mentioned disadvantages of the existing apparatus of that type are avoided.

More specifically, it is an object of this invention to provide an improved apparatus of the described type in which the contact pressure of the transducer or head against the magnetizable surface of the record disk is maintained substantially constant during a recording or reproducing operation.

Another object is to provide an apparatus of the described type, as aforesaid, having desirable recording and reproducing characteristics so as to be suitable for the recording and repeated reproduction of video signals, as in the slow motion or still playback of video signals.

Still another object is to provide an apparatus of the described type in which at least one of the support plates between which the pliant record disk is disposed is formed to provide a substantially uniform pressure in the air film flowing radially outward between that support plate and the record disk during a recording or reproducing operation of the apparatus.

In accordance with an aspect of this invention, at least one of the support plates, and preferably at least the support plate which confronts the surface of the pliant record disk opposed to the magnetizable surface of the latter, is formed with a perforate area that extends in the radial direction of the record disk from at least inside the annular area or record track contacted by the transducer to at least the outer periphery of the record disk so that pressure differences occurring in the air film between the record disk and that support plate are equalized through the perforations of the latter.

It is another feature of this invention to provide the perforate support plate with a conically dished configuration so that the spacing between the support plates is progressively reduced in the radially outward direction.

DESCRIPTION OF THE PREFERRED EMBODIMENT

Figures 1, 3:
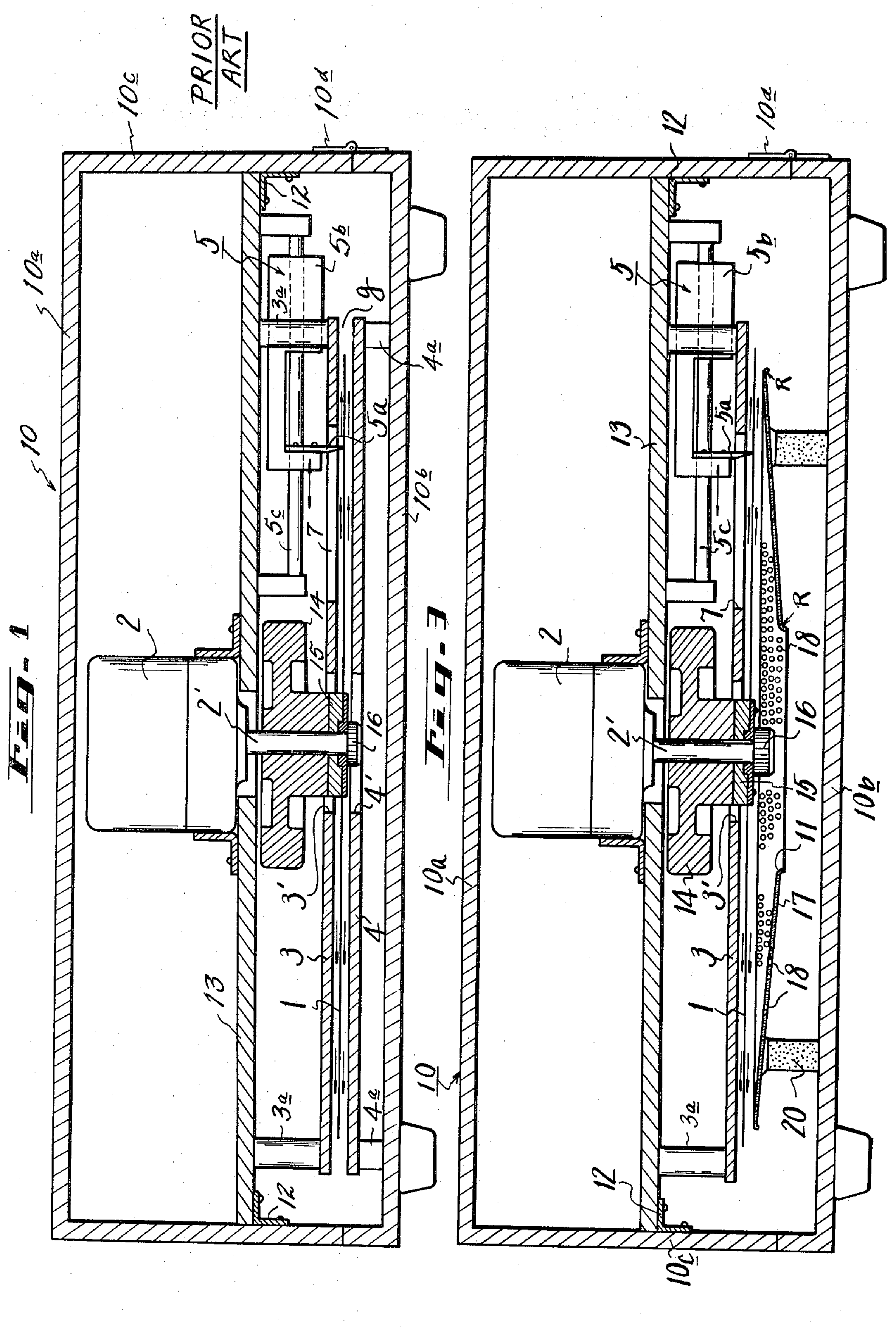
FIG. 1 is a vertical sectional view taken through the axis of rotation of the pliant record disk in a magnetic recording and/or reproducing apparatus according to the prior art.
FIG. 3 is a vertical sectional view similar to that of FIG. 1, but showing an apparatus according to an embodiment of the present invention.

Referring initially to FIG. 1, it will be seen that, in a conventional magnetic recording and/or reproducing apparatus of the type to which the present invention relates, a pliant record disk 1, for example, of a suitable plastic such as polyethylene terephthalate polymer, having a magnetizable upper surface formed, for example, by a coating of iron oxide, extends radially outward from a central rigid hub 15. Such hub 15 and a superposed fly wheel 14 are suitably secured, as by a threaded knob 16, on the rotatable shaft 2' of an electric motor 2 which is mounted on a deck plate 13 so that shaft 2' depends from the latter. The various components of the illustrated apparatus are shown to be contained within a cabinet 10 which includes top, bottom and side walls **10*a*, 10*b* and 10*c*, respectively. The side wall 10*c* is shown to depend from the perimeter of top wall 10*a* and to be preferably joined to the bottom wall or base 10*b* by means of a hinge structure 10*d* so that cabinet 10 may be opened to permit replacement of the pliant record disk 1 therein. Deck plate 13 is shown to be supported between top and bottom walls 10*a* and 10*b*, for example, by means of L-shaped brackets attached to side wall 10*c***.

In accordance with the prior art, pliant record disk 1 is shown to be disposed between planar, parallel, spaced apart upper and lower support plates 3 and 4, respectively, which are mounted on posts **3*a* depending from deck plate 13 and on posts 4*a*** projecting upwardly from botttom wall 10*b*. Support plates 3 and 4 are located so that, when pliant record disk 1 is centrifugally urged to a planar configuration in response to its rotation by operation of motor 2, the magnetizable upper surface and the opposed or lower surface of the pliant record disk are spaced from support plates 3 and 4, respectively, within the gap or clearance *g* between such support plates. Support plates 3 and 4 are further shown to have central apertures 3′ and 4′, respectively, so that, when pliant record disk 1 is rotated, air can enter through apertures 3′ and 4′ to form air films flowing radially outward between record disk 1 and upper support plate 3 and between record disk 1 and lower support plate 4, respectively, for maintaining the spacing of the record disk from the support plates. When the pliant record disk 1 is at rest, and thus limp, it is supported by one or both of the support plates 3 and 4 in dependence on the orientation of cabinet 10.

In order to record and reproduce signals on the magnetizable upper surface of record disk 1, the apparatus of FIG. 1 is further shown to include a transducer or head assembly 5 having an electro-magnetic transducer or head chip 5*a* which extends through a radial slot 7 in upper support plate 3 from a head carrier 5*b* thereabove which is movable along a radially directed guide rod 5*c* depending from deck plate 13. The transducer or head chip 5*a* extends a sufficient distance through slot 7 of support plate 3 to engage the upper magnetizable surface of pliant record disk 1 when the latter is rotated and thereby urged centrifugally to its substantially planar configuration. Thus, transducer or head chip 5*a* traces a record track in an annular area of the magnetizable surface, with the diameter of such annular area being determined by the position of head carrier 5*b* along guide rod 5*c*. Suitable recording, reproducing and control circuits (not shown) which are not essential to an understanding of the present invention may be mounted upon deck plate 13 and may be effective to cause transducer or head chip 5*a* to record video signals in a selected record track on the magnetizable surface of pliant record disk 1 during a recording operation, and then to repeatedly reproduce the video signals recorded in such record track, for example, during the still playback of such video signals. Alternatively, head carrier 5*b* may be moved progressively along guide rod 5*c* during the recording operation so that video signals corresponding to successive fields or frames are recorded in respective record tracks of progressively different diameters or in a spiral record track, and, during a reproducing operation, the head carrier 5*b* is similarly displaced so as to provide slow-motion playback of the recorded video signals.

During the recording of video signals and the slow-motion or still playback of the recorded signals, the described arrangement of support plates 3 and 4 according to the prior art is incapable of maintaining a stable or uniform contact pressure of the transducer or head chip 5*a* against the magnetizable surface of pliant record disk 1 with the result that the recording and reproducing characteristcs of the apparatus are deleteriously affected. More specifically, as shown on FIG. 2, the pressure in the air film flowing radially outward between record disk 1 and lower support plate 4 and represented by the arrows 6*b* is not uniform in the radial direction, but rather is relatively reduced in the portion of such air film disposed radially outward in respect to the record track at which transducer or head chip 5*a* engages the magnetizable surface of disk 1. Thus, the pressure in the air film flowing radially outward between the magnetizable surface of record disk 1 and upper support plate 3 and represented by the arrows 6*a* is greater than, or positive in relation to the pressure in the other air film 6*b* at the portions of the air films 6*a* and 6*b* disposed radially outward in respect to the record track traced by the transducer or head chip. As a result of the foregoing, the annular portion of pliant record disk 1 at the outside of the record track being traced by the transducer or head chip is deflected downwardly away from the latter, as shown in full lines on FIG. 2, and hence the contact pressure of transducer or head chip 5*a* with the magnetizable surface of pliant record disk 1 is unstable or tends to vary.

Referring now to FIG. 3, it will be seen that a magnetic recording and/or reproducing apparatus according to an embodiment of this invention, as there illustrated, is generally similar to the apparatus according to the prior art described above with reference to FIG. 1, and has its similar components identified by the same reference numerals. Generally speaking, in accordance with this invention, at least one of the support plates between which the pliant record disk is rotatable, and preferably at least the support plate which confronts the surface of the record disk opposed to the magnetizable surface thereof, is perforate over the area of such support plate which extends in the radial direction of the record disk from at least inside the annular area of the record track traced by the transducer or head chip 5*a* to at least the outer periphery of the record disk 1. Of course, in the case where the transducer or record chip 5*a* is radially displaceable to trace various radially spaced record tracks on the magnetizable surface of the record disk, as in the previously described apparatus, the perforate area of the support plate which confronts the record disk surface opposed to the magnetizable surface extends radially from at least inside the radially innermost position of the transducer or head chip to at least the outer periphery of the record disk. Further, in accordance with this invention, the support plate having the aforementioned perforate area preferably has a conically dished configuration so that the spacing between the support plates is progressively reduced in the radially outward direction of the record disk therebetween.

Figure 4:
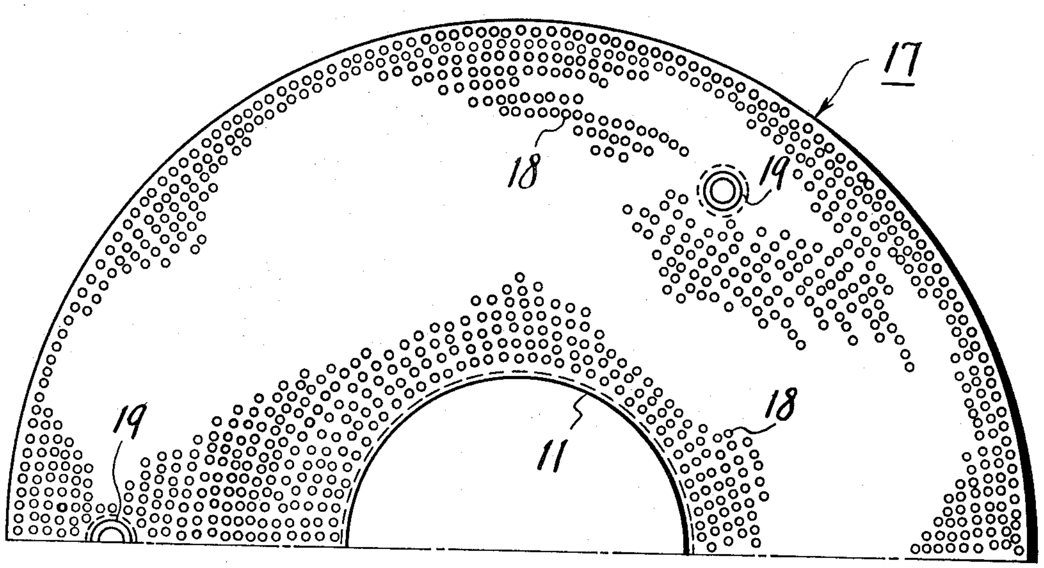
FIG. 4 is a fragmentary top plan view of a perforate support plate included in the apparatus of FIG. 3.

More specifically, in the embodiment of this invention illustrated on FIG. 3, the pliant record disk 1 having a magnetizable upper surface is shown to be rotatable between a planar upper support plate 3 and a lower support plate 17 having openings or perforations 18 uniformly dispersed or spaced apart over its entire area, as particularly shown on FIG. 4. The support plate 17 is upwardly conically dished so as to be upwardly inclined from its inner periphery extending around a central aperture 11 to its outer periphery. The ratio of the combined area of perforations 18 to the total area of support plate 17 in which the perforations are formed is preferably from approximately 30 to 50 percent. Further, when only the support plate which confronts the record disk surface opposed to the magnetizable surface is provided with perforations, as in the embodiment of the invention illustrated on FIG. 3, the inclination or slope of the conically dished support plate may desirably be approximately 1/50. For example, in the case where perforate support plate 17 has an outer diameter of 25cm, the inclination of the conically dished configuration of that support plate is such as to provide approximately a 5mm difference between the height of the support plate at its inner and outer peripheries.

In the illustrated embodiment of the invention, perforate support plate 17 is further shown to be formed with downwardly curved edges R at its inner and outer peripheries, and with an outer diameter that is slightly smaller than the outer diameter of the associated pliant record disk 1. For example, when support plate 17 has an outer diameter of 25 cm, as aforesaid, the associated record disk 1 may have an outer diameter of 30cm. The support plate 17 is conveniently formed by punching perforations or holes of suitable spacing and diameter in a thin metal sheet, for example, having a thickness of about 1.0mm, and then forming such sheet with the desired conically dished configuration and with the downwardly curved inner and outer peripheral edges R. The perforated support plate 17 is further preferably formed with a plurality of downwardly directed embossments 19 (FIG. 4) which are uniformly spaced apart relatively close to the outer periphery of the support plate and which have horizontal bottom portions suitably secured to elastic posts 20 (FIG. 3), for example, formed of rubber, secured to bottom wall 10*b*, for example, by means of flush-headed bolts (not shown).

Figure 2:
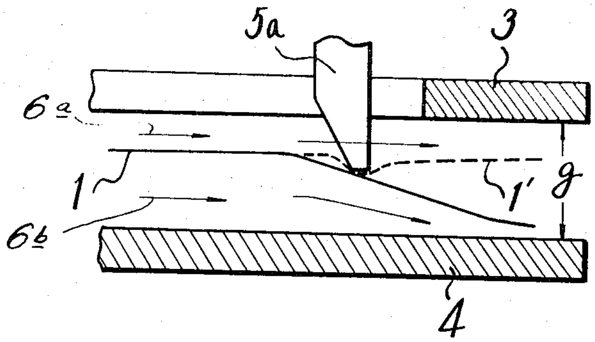
FIG. 2 is an enlarged, fragmentary sectional view illustrating, in full lines, the manner in which the prior art arrangement of FIG. 1 causes deflection of the record disk away from its desired position, shown in broken lines, in respect to the transducer.

When the magnetic recording and/or reproducing apparatus of the described type is provided with the perforated support plate 17 in accordance with this invention, the effect thereof is to ensure that the portion of the pliant record disk 1 disposed radially outward in respect to the record track being traced by transducer or head chip 5*a* is not deflected away from the latter, but rather assumes the most desirable shape, as indicated in broken lines at 1' on FIG. 2, and in which such portion of the pliant record disk is substantially coplanar iwth the portion of the record disk disposed radially inward of the record track being traced, whereby to maintain a substantially uniform or constant contact pressure of the transducer or head chip against the magnetizable surface for ensuring the maintenance of desirable recording and reproducing characteristics. Although the manner in which the support plate 17 according to this invention achieves the foregoing desirable result is not exactly or precisely understood, it is believed that the perforations 18 therein provide short circuit paths for air through which pressure differences at radially spaced apart locations within the lower air film 6*b* occurring by reason of the contact of transducer or head chip 5*a* with record sheet 1 may be substantially equalized to provide a uniform pressure throughout lower air film 6*b*.

The most advantageous ratio of the combined area of the perforations to the total perforated area of support plate 17, within the preferred range previously mentioned for that ratio, and the most advantageous inner and outer diameters and inclinations of support plate 17 and gap width between the outer periphery of support plate 17 and the upper support plate 3 may all be determined experimentally so as to achieve the most stable contact pressure of the transducer or head chip 5*a* against the magnetizable surface of pliant record sheet 1.

It will be understood that, when the pliant record disk 1 has its magnetizable surface at the underside of the record disk, rather than on the upper side thereof as in the embodiment illustrated on FIG. 3, an apparatus of the described type according to this invention may retain the planar lower support plate 4 appearing in FIG. 1, but provided with a radial slot permitting the transducer or head chip 5*a* to extend upwardly therethrough for engagement with the lower magnetizable surface of the record disk, and, in that case, the planar upper support plate 3 is replaced by a perforate support plate similar to the previously described support plate 17 but inverted so as to be downwardly conically dished.

Further, various tests that have been conducted indicate that the desirable results according to this invention can be achieved when both support plates having the pliant record disk rotatable therebetween are similar to the previously described perforate support plate 17 and are oppositely conically dished, with the inclination of such conically dished support plates and the ratios of the combined areas of their perforations to the respective total areas of the plates being suitably experimentally determined.

Although an illustrative embodiment of this invention and various modifications thereof have been desdribed in detail herein with reference to the accompanying drawings, it is to be understood that the invention is not limited to that precise embodiment or the described modifications thereof, and that various changes and further modifications may be effected therein by one skilled in the art without departing from the scope or spirit of the invention, as defined in the appended claims.

What is claimed is:

1. In an apparatus for magnetically recording and/or reproducing electrical signals and which comprises a rotatable shaft, drive means for rotating said shaft, a pliant record disk mounted at its center on said shaft for rotation with the latter and having a magnetizable surface, first and second spaced support plates respectively confronting said magnetizable surface and the opposite surface of said record disk and located to be spaced from said record disk when the latter is centrifugally urged to a substantially planar configuration in response to rotation of said shaft, apertures in said support plates through which air enters when the record disk is rotated for forming air films flowing radially outward between said record disk and support plates and maintaining the spacing therebetween, and electromagnetic transducer means for pressing against and contacting said magnetizable surface and tracing at least one record track in a respective annular area of said magnetizable surface upon rotation of said record disk with said shaft; at least one of said support plates being perforate over the area thereof that extends in the radial direction of said record disk from at least inside said annular area of the record track traced by said transducer means to at least the outer periphery of said record disk, and said one support plate having a conically dished configuration so that the spacing between said support plates is progressively reduced in the radial direction from the center to the outer periphery of said record disk.

2. An apparatus according to claim 1; in which said aperture of said one support plate is centered in respect to the center of said record disk, and said perforate area of the said one support plate extends from said aperture thereof to the outer periphery of said one support plate.

3. An apparatus according to claim 1; in which said perforate area of said one support plate is constituted by numerous openings therein having a combined area which is approximately 30 to 50 percent of said perforate area.

4. An apparatus according to claim 1; in which said one support plate is the second support plate confronting said opposite surface of the record disk.

5. An apparatus according to claim 4; in which said support plates both have circular outer peripheries and the outer diameter of said second support plate is smaller than the outer diameter of said first support plate.

6. An apparatus according to claim 4; in which said transducer means extends through said first support plate for contacting said magnetizable surface.

7. An apparatus according to claim 6; in which said first support plate has a radially directed slot through which said transducer means extends, said transducer means is displaceable in the direction extending radially in respect to said shaft for selectively tracing a plurality of record tracks in annular areas on said record disk at corresponding different radial distances from the center of the record disk, and said perforate area of said second support plate extends radially from at least inside the radially innermost position of said transducer means to at least said outer periphery of the record disk.

* * * * *